United States Patent [19]

Linderholm

[11] Patent Number: 5,729,606
[45] Date of Patent: Mar. 17, 1998

[54] TELEPHONE CORD HOLDER

[76] Inventor: David R. Linderholm, 2431 Huron Rd., Waukegan, Ill. 60087

[21] Appl. No.: 668,919

[22] Filed: Jun. 24, 1996

[51] Int. Cl.$^6$ .................................................. H04M 1/00
[52] U.S. Cl. ........................................ 379/438; 379/437
[58] Field of Search .................................... 379/438, 437, 379/451, 433, 428; 439/299, 304, 352, 368, 370

[56] References Cited

U.S. PATENT DOCUMENTS 1,989,823  2/1935  Raabe ........................................ 439/370
4,647,726  3/1987  Blum ......................................... 379/438

*Primary Examiner*—Jack K. Chiang
*Attorney, Agent, or Firm*—Paul H. Gallagher

[57] ABSTRACT

A one-piece metal clip, of spring material, having spaced prongs at a second end forming a convex bearing point near a first end and a recess forward thereof. At a trailing end it has a re-bent hook. The clip is fitted on a releasable and detachable fitting on a telephone instrument by which the cord is secured to the instrument, to overcome weakness in the fitting and cord.

7 Claims, 1 Drawing Sheet

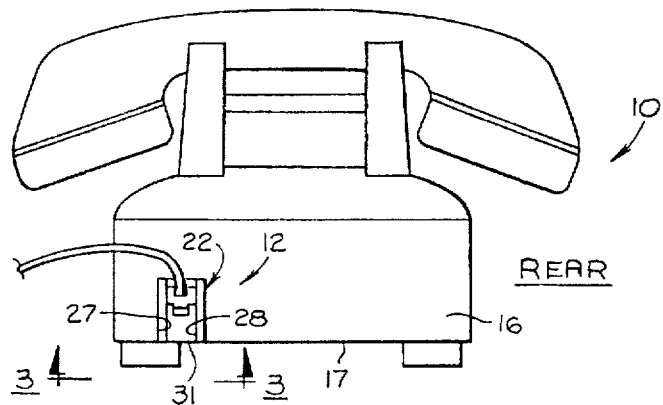
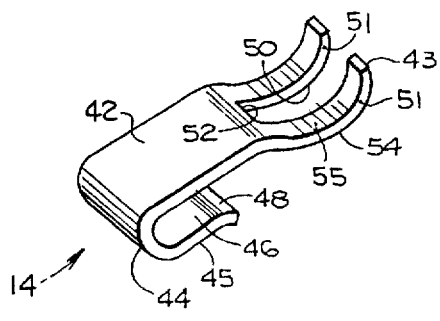
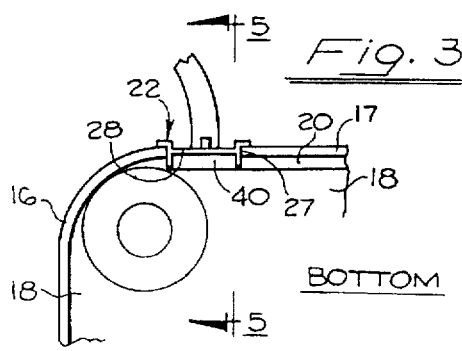
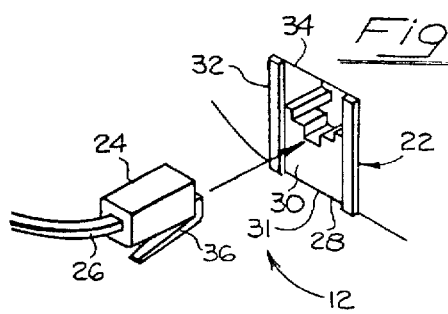
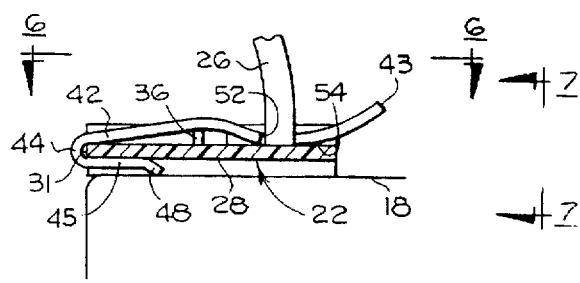
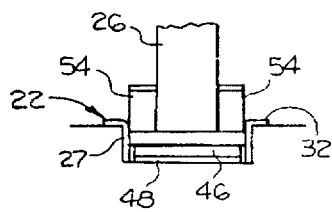
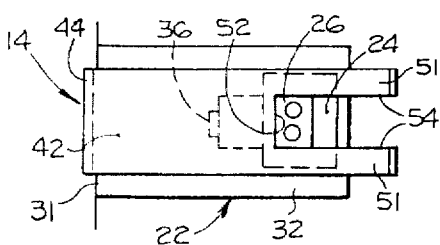

TELEPHONE CORD HOLDER

SUMMARY OF THE INVENTION

The invention resides in the general field of telephone instruments, and more particularly to additions or accoutrements applied to the telephone instruments. Telephone instruments generally include a cord assembly for detachably connecting a cord in the main instrument. This assembly includes a fitting in the main instrument, and a plug on the cord that is detachably inserted in the fitting. The elements making up these components, namely the fitting and plug, are relatively weak in construction, and somewhat fragile, and they are subject to breakage or damage in their handling. Sometimes, less seriously, simply the plug becomes detached, and another difficulty is that at times, because of the lack of a secure connection, there are crackling sounds in the conversation circuit.

A main object of the present invention is to provide a device for overcoming the foregoing objections, having the following features and advantages.

1. It is in the form of a simple clip that can be applied to the cord assembly for securely holding the plug in the fitting.

2. It can be applied to the cord assembly on the telephone in a very simple manner, without in any way necessitating change or alteration in the assembly.

3. It provides greater physical strength in the assembly.

BRIEF DESCRIPTION OF THE INDIVIDUAL FIGURES OF THE DRAWINGS

FIG. 1 is a view of a telephone having a cord assembly of the kind referred to.

FIG. 2 is a perspective view of the cord holder of the invention.

FIG. 3 is an enlarged fragmentary view taken at line 3—3 of FIG. 1.

FIG. 4 is an exploded view of the main members of the cord assembly.

FIG. 5 is a fragmentary view oriented according to line 5—5 of FIG. 3.

FIG. 6 is a view taken from the top of FIG. 5 as indicated by the line 6—6 of FIG. 5.

FIG. 7 is a view taken from the right of FIG. 5 indicated by the line 7—7 of FIG. 5.

DETAILED DESCRIPTION OF THE DRAWINGS

Reference is first made to FIG. 1 showing a telephone instrument 10 to show the environment in which the device of the present invention is utilized. This figure shows the instrument from the rear, and a cord connector assembly is indicated in its entirety at 12. FIG. 2 shows the cord holder of the invention, indicated at 14 which will be described later in detail.

For convenience in describing the positioning and functioning of the holder 14 of the invention, the following is a brief description of the telephone instrument and the manner in which the holder is applied thereto. The telephone instrument 10 is of known or conventional form, and includes an outer casing or shell 16 (FIG. 3) having a lower edge 17, and an interior body 18. The parts are dimensioned and proportioned such that a space 20 is formed between the casing and the body, adjacent the rear of the instrument, and more particularly positioned for accommodating the cord connector assembly 12, as described below.

The main parts of the cord connector assembly 12 include a fitting 22, and a plug 24 secured to the end of the cord 26.

The casing 16 of the instrument is provided with a notch or opening 27, in which the fitting 22 (FIG. 4), is positioned. The fitting and the plug, as indicated above, are of known kind, but a brief description of their construction and positioning in the instrument are given. For convenience, the assembly 12 is described as oriented in FIGS. 1 and 4, with the understanding that it may be put in other positions instead. The fitting 22 has a main portion 28, in the form of a leaf element or flat panel having an outer surface 30 and a bottom edge 31. It also has side walls 32, and an aperture 34 forming a socket, near the top, of predetermined outline shape to receive the plug 24. The plug has a regular rectangular shape in cross section, and is fitted in the socket, and has a movable detent 36 for releasably holding the plug in the socket. When the plug is in the socket, its outer end surface is adjacent the outer surface 31 and the detent 36 extends outwardly beyond that surface (FIG. 5). The cord extends generally perpendicular from the end of the plug, and thus perpendicular from the panel 28.

The fitting 22 is placed in the notch 27 in the instrument casing, in a known manner (FIGS. 1 and 3), having suitable contour receiving the side edges of the notch 27. When so fitted therein, the bottom edge 31 of the panel is positioned generally in line with the lower edge 17 of the casing (FIGS. 1, 3). In this position of the fitting 22, a space 40 is formed between the panel 28 and the body 18 of the instrument, this space being in line with the space 20 identified above, and particularly to receive an element of the cord holder of the present invention.

The elements described above are fitted together and fitted to the casing of the instrument, and when so fitted appear as shown in FIG. 1. The holder 14 (FIG. 2) of the invention is applied to the instrument when those elements are in place, as described below.

The cord holder 14 is in the form of a single integral, one-piece clip. The clip preferably is made of steel with a certain degree of flexibility and yieldability, for providing a gripping and holding function.

The clip is made from an elongated flat piece, and includes a main body 42, which, for convenience, is identified as having a first or leading end 44 and a second or trailing end 44. At the end 44, the strip is bent-back on itself to form a U-shape hook 45 substantially parallel to the main body 42, forming a space 46 therebetween. The extended or free end of the hook 45 may be provided with a down turned edge 48 to facilitate its insertion in place.

The clip at its second or leading end has a notch 50 extending longitudinally, and opening longitudinally outwardly through that end, forming prongs 51. The notch has an inner or closed end 52, determining the length of the notch, and serving a limiting function as described below.

The leading end portion of the clip is bent or curved, forming a convex bearing element or under surface indicated at 54, for forming a gripping surface, and this convex bearing element extends below the under surface of the main body 42, that is, it extends into the longitudinal projection of the space 46. A concave surface element 55 is formed inwardly of the convex element 54.

The cord holder or clip 14 is dimensioned to fit between the side walls 32 of the fitting 22, with a sliding fit. The space 46 may be slightly greater in dimension, perpendicular to the elements 42, 45, than the thickness of the panel 28.

To apply the clip to the assembly 12, the leading end 44 is inserted into the space between the walls 32 and pushed upwardly therealong, with the hook 40 entering into the space 46, and thus the elements 42, 45 straddle the panel 28.

In this movement, the leading or front end portion 43 rides onto and over the exposed end of the plug 24, FIG. 6, with the notch 50 receiving the cord and the prongs thus straddling the cord. The notch is of such length that when the trailing end of the clip engages the panel 28, and thereby the clip is in full inserted position, the rear end edge of the notch 52 engages the cord, or nearly so, and the concave element 55 is disposed over the detent 36 of the plug. The entire plug is thus substantially covered, and it is protected, with only the cord extending outwardly from or away from the fitting 22.

The engagement of the element 54 on the plug (FIG. 6) produces an upward cocking position of the clip, causing a binding effect at the lower edge of the panel 28 by the hook 45. These points of engagement, provide a secure friction holding effect. The clip is not easily dislodged, and remains in full effect despite rough handling of the instrument, and the entire instrument can be supported easily by the cord when the clip is in place.

Another great advantage is that if the detent 36 should become broken, as does occasionally happen, the plug 24 would pull out, but in the use of the holder of the invention, the holder in engaging the plug, holds it securely in position, and in this case too, the holder is so effective that the instrument can be lifted by the cord, without the plug pulling out of the instrument.

It is also pointed out that there need be no alteration or adjustment of any of the elements of the telephone instrument or of the assembly 12 in applying and using the cord holder of the invention. The clip can be easily removed, when desired, by merely pulling it out, for providing access to the assembly 12, as for servicing.

The device is extremely inexpensive, both in materials used and in steps of fabrication.

I claim:

1. A cord holder for a telephone instrument having a fitting with a socket therein for receiving a plug on a cord, the fitting having a leaf element with an outer exposed surface and the plug when in the socket having an outer surface adjacent the outer surface of the leaf element, the cord holder comprising,
 a clip in the form of a flat elongate strip, having a central body portion, a U-shape grip hook at a trailing end and a blocking portion at a leading end, and
 the cord holder being capable of being put in active position on the fitting by placing the grip hook under the leaf element, the body portion over the leaf element, and the blocking portion over the plug,
 whereby the grip hook grips the leaf element and holds the clip on the fitting and the blocking extension bears tightly against the plug and prevents the plug from being pulled out of the socket.

2. A cord holder according to claim 1 wherein in addition, the cord is positioned substantially perpendicular to said outer exposed surface when the plug is in the socket, wherein, the clip has a notch extending longitudinally and opening longitudinally through the leading end thereof, a slot forming laterally spaced prongs which straddle the cord and engage the plug when the clip is in the active position.

3. A cord holder according to claim 2 wherein in addition the plug includes a detent exposed above said exposed surface of the leaf element at a position on the side of the cord in the direction toward a first end, and the notch is of such length that when the trailing end of the clip engages the end of the leaf element, the body portion of the clip engages and covers the detent, and the clip has a concave under surface covering the detent.

4. A cord holder according to claim 3 wherein in addition, the fitting includes walls at the side edges of said outer exposed surface, and the width of the clip is nearly the distance between the walls but the clip has a sliding fit therebetween.

5. A cord holder according to claim 1 wherein, the body has an essentially flat under surface, the grip hook has a position substantially parallel with said under surface, forming a space therebetween, and the clip at its leading end has a friction gripping element extending into the longitudinal projection of said space.

6. A cord holder according to claim 1, in combination with said fitting and plug.

7. A cord holder according to claim 1, in combination with the telephone instrument.

* * * * *